United States Patent [11] 3,596,943

[72] Inventor Walter Francis Krauss
 Natalia Ave., Huntingdale, Victoria, Australia
[21] Appl. No. 862,404
[22] Filed Sept. 30, 1969
[45] Patented Aug. 3, 1971
[32] Priority Oct. 3, 1968
[33] Australia
[31] 44285/68

[54] SHAFT MOUNTINGS FOR PULLEYS, SHEAVES AND THE LIKE
 5 Claims, 3 Drawing Figs.

[52] U.S. Cl. ................................................. 287/52.06
[51] Int. Cl. ................................................. F16d 1/06
[50] Field of Search ................................. 287/52.06, 52.04, 52; 74/230.4, 230.3

[56] References Cited
UNITED STATES PATENTS
827,346  7/1906  Bubb ............................ 287/52 UX

| 1,580,919 | 4/1926 | Reeves | 74/230.3 |
| 2,669,471 | 2/1954 | Breslow | 287/52.06 |
| 2,710,762 | 6/1955 | Whitaker | 287/52.06 |
| 2,726,106 | 12/1955 | Houck | 287/52.06 |
| 2,890,071 | 6/1959 | Johnson | 287/52.06 |
| 2,998,731 | 9/1961 | Renner | 287/52.04 X |
| 3,134,268 | 5/1964 | Firth | 287/52.06 X |

Primary Examiner—David J. Williamowsky
Assistant Examiner—Andrew V. Kundrat
Attorney—Burns, Lobato & Zelnick ABSTRACT: A shaft mounting having a sleeve which fits over the shaft and which has a tapered external surface engageable within a hub portion of the part to be secured to the shaft, and an annular element which is engageable externally over the hub portion, the sleeve and annular element being movable axially towards one another by tightening of screws engaged therewith to fasten the hub to the shaft.

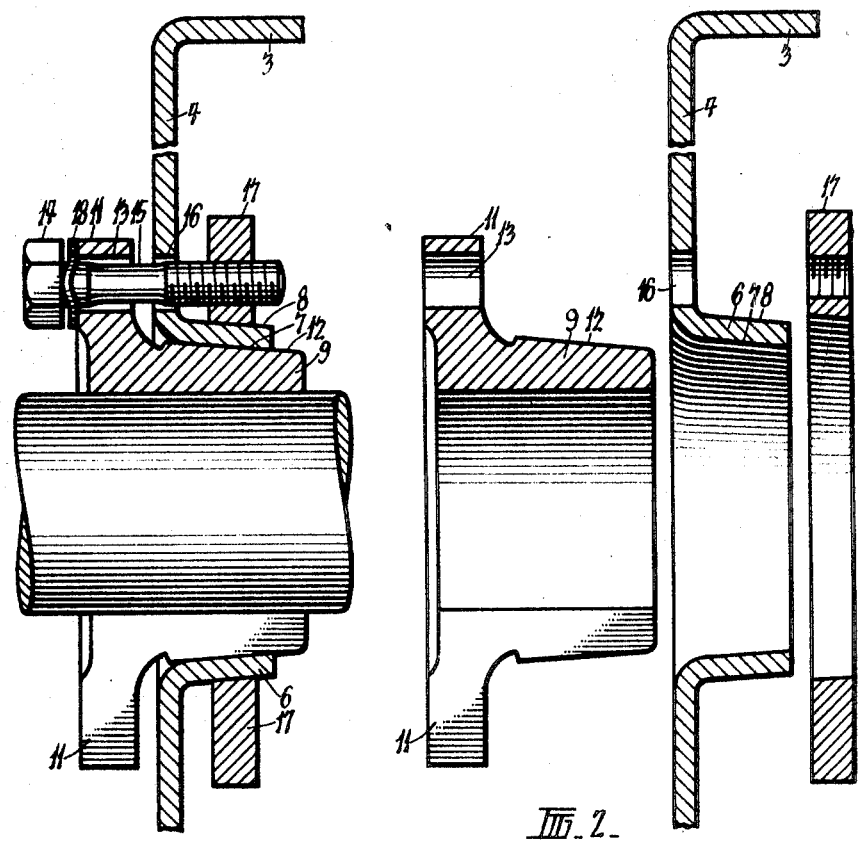
Fig. 1.
Fig. 2.
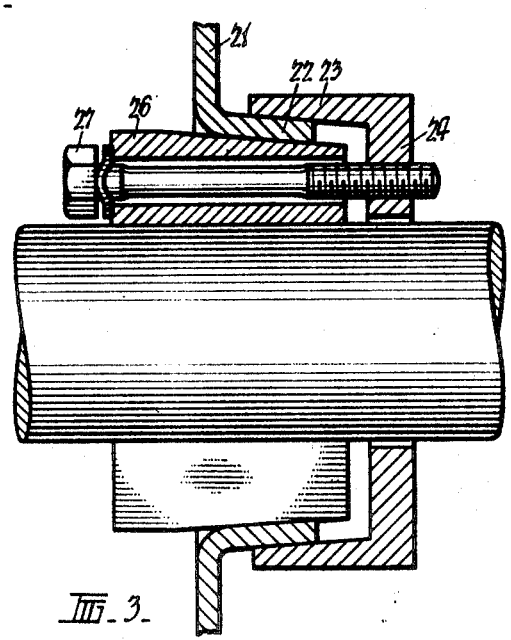
Fig. 3.

SHAFT MOUNTINGS FOR PULLEYS, SHEAVES AND THE LIKE

FIELD OF THE INVENTION

This invention relates to the mounting of pulleys, sheaves, gears, sprockets, discs and the like on shafts.

More particularly the invention relates to mountings of the type in which a tapered sleeve is fitted into a tapered bore in the pulley or the like and is drawn, by operation of a number of screws into firm engagement with the bore so as to be contracted onto a shaft. In one common form of mounting of this type, the sleeve is longitudinally split and is provided with a flange which is drilled to receive the screws and the screws engage tapped holes in the body of the pulley or the like. With this arrangement the screws exert considerable forces on the body in a region which is subject to stress concentration. The region of the body provided with the tapped holes must therefore be quite thick to withstand these forces and in many cases this is inconvenient. For example, wide belt pulleys conventionally comprise a tubular rim and two annular end discs. If the conventional mounting is employed, the screws must be fitted to tapped holes in the end discs around their inner peripheries. Because of the forces imparted by the screws, the end discs must be formed from very thick plate or be locally thickened, for example by forging. The present invention provides a mounting which enables quite thin end discs to be employed with consequent saving in material.

In accordance with the invention means are provided for mounting a disc or the like on a shaft, so that the disc will rotate with the shaft without being subjected to mounting stresses. The mounting means comprises a sleeve disposed on the shaft and having an outer surface which is axially tapered. The disc is provided with an axially located integral hub-flange having a tapered bore for reception over the tapered surface of the sleeve. The respective taper angles are the same and thereby provide for engagement between the hub-flange and sleeve along the entire surface of the bore in the hub-flange. An annular element is received over the outer axially extending portion of the hub-flange for engagement along mutually tapered surfaces, and fastening means, such as screws, are connected between the sleeve and annular element for drawing the two together. Thus, the fastening means causes relative axial movement between the hub-flange and sleeve, and between the hub-flange and annular element, thereby aligning them on the shaft and securing them so that the hub-flange is substantially free of any axial stress.

A pulley comprising a generally tubular rim and a pair of annular end discs may be provided with a pair of mountings according to the invention. The hubs of these mountings may be in the form of flanges located at the inner peripheries of the annular end discs.

BRIEF DESCRIPTION OF THE DRAWINGS

In order that the invention may be more fully explained two specific embodiments thereof will now be described with reference to the accompanying drawings in which:

FIG. 1 is a longitudinal section through part of a pulley having a pair of shaft mountings in accordance with the invention;

FIG. 2 is an exploded view corresponding to FIG. 1 and showing parts of the shaft mounting of FIG. 1 disassembled; and FIG. 3 is a longitudinal section through part of a pulley having shaft mountings of an alternative construction in accordance with the invention.

DESCRIPTION OF PREFERRED EMBODIMENTS

FIGS. 1 and 2 illustrate part of a pulley which comprises a rolled plate rim and two annular end discs. The figures show part of the cylindrical rim 3 and one of the end discs 4. End disc 4 is formed from metal plate and at its inner periphery a hub flange 6, which may be formed by a hot pressing technique, projects inwardly of the pulley.

The inner periphery 7 and the outer periphery 8 of hub-flange 6 are both machined to a 4° taper, with both surfaces tapering inwardly to the right as seen in FIG. 1.

A longitudinally split sleeve 9 having a split end flange 11 has a tapered external surface 12 to fit the bore of hub-flange 6. Flange 11 has circumferentially spaced holes 13 to receive screws 14 which also project through holes 16 in end disc 4 to engage tapered holes in an annular ring 17 which locates on the outer peripheral surface 8 of hub-flange 6, the inner periphery of ring 17 being machined to a taper to suit the taper of the outer peripheral surface of the hub-flange. Screws 14 are necked at 15 to avoid stretching of their threaded ends. Resiliently compressible corrugated washers 18 are fitted between the heads of screws 14 and flange 11 of sleeve 9.

Tightening of screws 14 draws ring 17 to the left and sleeve 9 to the right. This causes a wedging action between the inner periphery of ring 17 and the outer periphery of hub-flange 6 and also between the inner periphery of the hub-flange and the outer periphery of sleeve 9 such that the hub-flange is firmly gripped between ring 17 and sleeve 9 and the sleeve is wedged inwardly so that it contracts and can thereby grip a shaft inserted therethrough. It will be appreciated that tightening of screws 14 does not generate large forces in end disc 4, the only forces exerted on the pulley body being generally equal and opposite compressive forces on hub-flange 6.

The resiliently deformable washers 18 are chosen so that when they are compressed there is a predetermined axial tension in screws 14 generating a required clamping force on sleeve 9.

FIG. 3 shows a modified form of mounting which is particularly suitable in cases where the pulley is required to withstand large forces since it does not require any drilling of the pulley body. In this case, the end disc 21 of the pulley is formed with a hub-flange 22 as before. However, in this case the annular ring 23 has an inwardly directed end flange 24 which is provided with the tapped holes to receive the screws. The longitudinally split outer sleeve 26 is not provided with an end flange but is thickened so that it can be drilled with holes to receive the longitudinal clamping screws 27. As before the tightening of the clamping screws draws the annular ring to the left and the longitudinally split sleeve to the right so that the hub-flange is firmly gripped between them and the longitudinally split sleeve is wedged inwardly.

It is important to note that, in both described embodiments, the hub-flange is gripped by oppositely directed movements of the sleeve (9 or 26) and annular ring (17 or 24) and these movements are effected by forces applied between these parts (by the tightening of bolts 14 or 27) rather than by forces applied directly to the hub, as in the prior arrangements. The parts 9, 17 or 24, being free to move axially of the shaft relatively to the hub, merely assume differentially varying axial positions during tightening and so impose little, if any, stress on the hub. As a result of this, stress concentration in the hub is minimal. Also, since there is no substantial tendency for axial movements of the parts 9, 17 or 24, 26 to be transferred to the hub during tightening, accurate axial positioning of the hub is facilitated.

The above-described embodiments of the invention have been advanced by way of example only and many modifications and variations may be made thereto. For example, in order to save the cost of machining, the outer periphery of the hub-flange may be left unmachined and the inner periphery of the ring merely serrated so that it will "bite" into the hub-flange and provide the necessary gripping action. The longitudinally split metal sleeve could be replaced by a nonsplit deformable sleeve. Such a sleeve could, for example be constructed of a plastics material. The mountings can also be adapted to suit other types of pulleys, sheaves, gears, discs and the like. For example, in the case of a pulley or gear having a single central web, a single mounting could be disposed at the inner periphery of that web. It is accordingly to be understood that the invention is in no way limited to the details of the illustrated constructions but includes many variations within the scope of the appended claims.

I claim:

1. Means for mounting an integral disc and hub-flange combination on a shaft, comprising
   a sleeve, and means for fixing said sleeve on a shaft, said sleeve having an axially tapered outer surface,
   an annular disc having an integral hub-flange disposed centrally of the inner periphery thereof, said hub-flange having an axially tapered outer surface, and having an axially tapered bore which is received over said tapered outer surface of said sleeve,
   an annular element having a bore which is axially tapered in the same direction as the bore of said hub-flange and which is received over said axially tapered outer surface of said hub-flange and spaced axially from said integral disc in assembled position, said integral disc extending radially outward beyond the outer peripheries of said sleeve and annular element, and
   fastening means engaging only said sleeve and annular element for concurrently holding said tapered bore of said annular element in engagement with said outer surface of said hub-flange, and for holding said tapered bore of said hub-flange in engagement with said outer surface of said sleeve, whereby said hub-flange is axially aligned with respect to said shaft and held for rotation therewith.

2. Means for mounting an integral disc and hub-flange combination on a shaft as set forth in claim 1, in which said means for fixing said sleeve on a shaft comprises a split in said sleeve, whereby said fastening means causes compression of said split sleeve against said shaft due to said engagement between said hub-flange and sleeve.

3. Means for mounting an integral disc and hub-flange combination on a shaft as set forth in claim 1, in which said fastening means comprises a plurality of screws, said annular element has a flange extending radially inward and having a plurality of axially disposed openings therein, and said sleeve has a plurality of openings aligned with the openings in said annular element flange, wherein said screws are received respectively in said aligned openings for drawing together said sleeve and annular element.

4. Means for mounting an integral disc and hub-flange combination on a shaft as set forth in claim 1, in which said fastening means comprises a plurality of screws, said sleeve has a flange extending radially outward and having a plurality of axially disposed openings therein, and said annular element has a plurality of openings aligned with the openings in said sleeve flange, wherein said screws are received respectively in said aligned openings for drawing together said sleeve and annular element.

5. Means for mounting an integral disc and hub-flange combination on a shaft as set forth in claim 1, in which the tapers of said bores and said respective outer surfaces of said sleeve and hub-flange are substantially the same.